April 16, 1957   J. KOLBE   2,788,986
FORCE DIVERTER FOR TWO MOTION CENTER BANKING CARS
Filed Dec. 24, 1953   5 Sheets-Sheet 1

INVENTOR.
JOACHIM KOLBE
BY
Andrus & Sceales
Attorneys

April 16, 1957  J. KOLBE  2,788,986
FORCE DIVERTER FOR TWO MOTION CENTER BANKING CARS
Filed Dec. 24, 1953  5 Sheets-Sheet 2

INVENTOR.
JOACHIM KOLBE
BY
Attorneys

April 16, 1957  J. KOLBE  2,788,986
FORCE DIVERTER FOR TWO MOTION CENTER BANKING CARS
Filed Dec. 24, 1953  5 Sheets-Sheet 3

INVENTOR.
JOACHIM KOLBE
BY
Andrus & Sceales
Attorney

April 16, 1957  J. KOLBE  2,788,986
FORCE DIVERTER FOR TWO MOTION CENTER BANKING CARS
Filed Dec. 24, 1953  5 Sheets-Sheet 4

INVENTOR.
JOACHIM KOLBE
BY
*Andrus & Scales*
Attorneys

April 16, 1957   J. KOLBE   2,788,986
FORCE DIVERTER FOR TWO MOTION CENTER BANKING CARS
Filed Dec. 24, 1953   5 Sheets-Sheet 5

INVENTOR.
Joachim Kolbe
BY

United States Patent Office 2,788,986
Patented Apr. 16, 1957

2,788,986

FORCE DIVERTER FOR TWO MOTION CENTER BANKING CARS

Joachim Kolbe, Menomonee Falls, Wis.

Application December 24, 1953, Serial No. 400,313

20 Claims. (Cl. 280—112)

This invention relates to inward banking motor vehicles, and in particular to a control mechanism for eliminating undesirable effects of given lateral forces exerted on such vehicles while maintaining desirable banking effects of selected lateral forces exerted on the vehicles.

The invention relates more specifically to an improvement for banking vehicles of the kind, wherein two motion centers are provided about which the superstructure simultaneously turns in reaction to centrifugal forces during curve ride, one motion center being located near the road and serving as a wheel or axle suspension motion center, and the other motion center being located above or near the height of the center of mass of the vehicle superstructure and serving as a banking motion center.

The principal object of the invention is to maintain lateral rigidity between the running gear and the superstructure under the impact of lateral force components resulting from road shocks exerted on the wheels of the vehicle without interfering with banking turn movement of the superstructure relative to the running gear in response to centrifugal forces exerted on the vehicle.

Another object of the invention is to substantially block movement about the banking motion center in response to all but centrifugal forces exerted on the superstructure of the vehicle and to forces entering the vehicle by way of its superstructure.

Another object of the invention is to eliminate banking shimmy motions, i. e. secondary lateral motions resulting from wheel shimmy motions and tending to shift the running and banking gear to an ever increasing extent periodically from side to side until the vehicle becomes unmanageable.

Another object is to assist in stabilizing the vehicle in response to one-sided loads exerted on the superstructure.

Another object is to stabilize the position of the vehicle superstructure in response to single wheel road shock loads.

Another object is to keep wheel oscillation in general in a substantially vertical direction both relative to the road and to the superstructure and to avoid intermingling of vertical and lateral motions resulting from wheel oscillations.

Another object is to control wheel oscillation and its effect on the springs, shockabsorbers and stops with regard to the position of the superstructure relative to the running gear both during straight ahead ride and curve ride in a banking vehicle.

Another object is to control undesirable forces acting on the vehicle by first reducing their size by means of gear mechanisms and to apply the controlling means to the remaining force components only.

Another object is to divert undesirable forces exerted on the running gear of the vehicle into a direction unfavorable to disturbing movement of the running gear and to direct desirable forces along a path suited for operation of the banking mechanism.

Another object is to provide suitable locations for the attachment of the control means designed to increase the driving qualities and the safety of banking cars.

Another object is to create a near state of balance with regard to relative movement between running gear and superstructure for the turn of the superstructure about the banking motion center during the influence of the banking activating forces and to apply controlling forces by either adding or subtracting from the designed resistance to effect the desired banking motion.

Another object is to exert control over relative lateral movement between running gear and superstructure by permitting banking motion to take place within small defined sections interrupted by complete stops until the full lateral shift is secured.

According to the invention relative lateral shifts between superstructure and running gear are possible only during actuation of release mechanism responsive to lateral forces active upon the superstructure or a part thereof.

The accompanying drawings illustrate various embodiments of the invention and vehicle mechanism to which the invention has been applied.

The force diverter device according to the invention consists of structure interconnecting the banking running gear and the superstructure of the banking vehicle, and designed to block relative lateral movement between the two, unless activated by a release mechanism which is responsive to centrifugal forces and substantially inoperative in response to road shock-forces exerted on the vehicle. The device in general comprises two sets of gears or similar motion transfer mechanism, design to secure an increasing change in the speed of the turn of the gear wheels, with one set free to operate both during speed up and reduction of speed and the other substantially irreversible or self locking in one condition.

Figure 1:
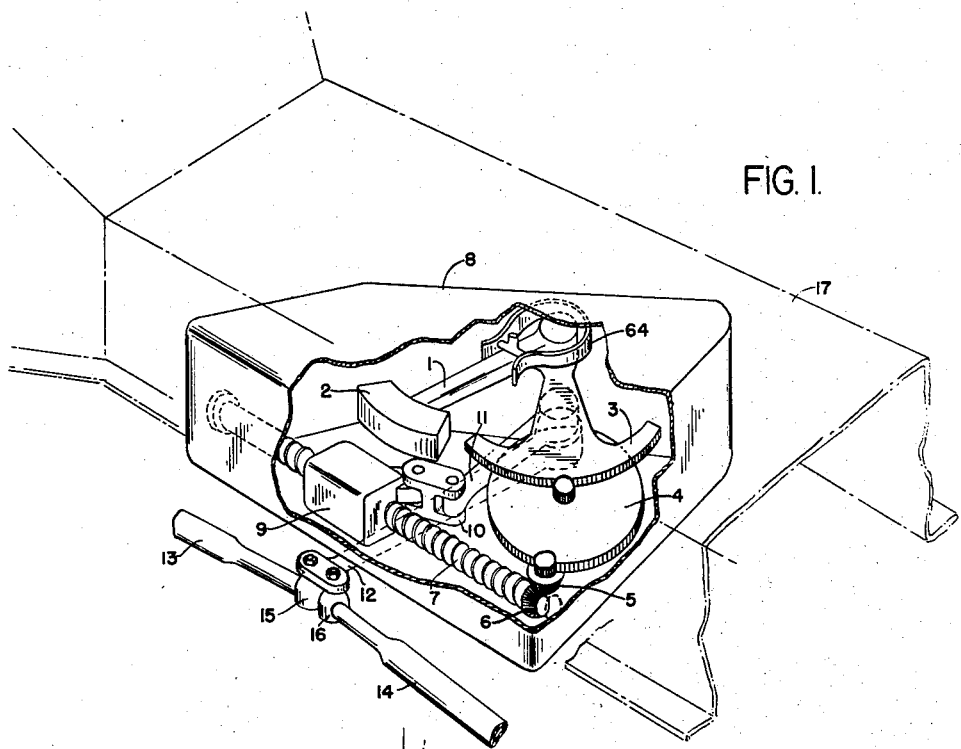
Figure 1 is a schematic perspective view of a release mechanism according to the invention.

As illustrated in Figure 1 a lever arm 1 carrying a weight 2 on its outer end operates a train of gears or gear sections 3 and 4 during the shifting of the weight 2 out of its normal center position, increasing the speed of turn at a predetermined rate. By means of a set of bevel gears 5 and 6 the turn is transferred to a worm gear rod 7. The shafts of the lever arm 1 and the gears 3, 4, 5, 6, and 7 are rotatably supported by the gear housing 8. The worm gear 7 carries a nut block 9 which during the shifting of the weight 2 shifts along the axis of worm gear 7 and by means of a shackle 10 and a lever arm 11 forces the lever arm 12 to turn. The levers 11 and 12 are rigidly attached to each other and turn about a common gear housing supported shaft. The tie rods 13 and 14 are attached by ball and socket joints 15 and 16 to the outer end of lever arm 12.

Figure 3:
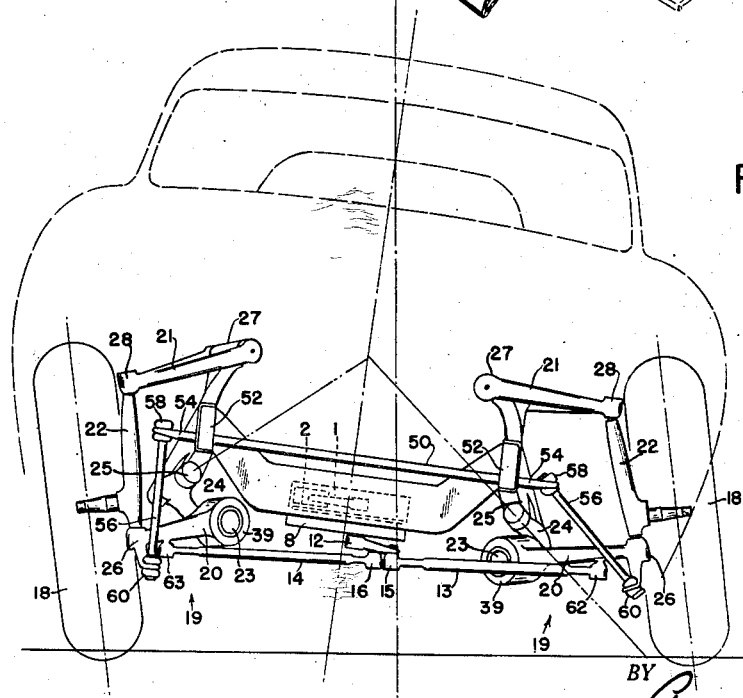
Fig. 3 is a front end elevation of the vehicle structure illustrated in Fig. 2 including the release mechanism and shown in banked position of the superstructure.
Figure 2:
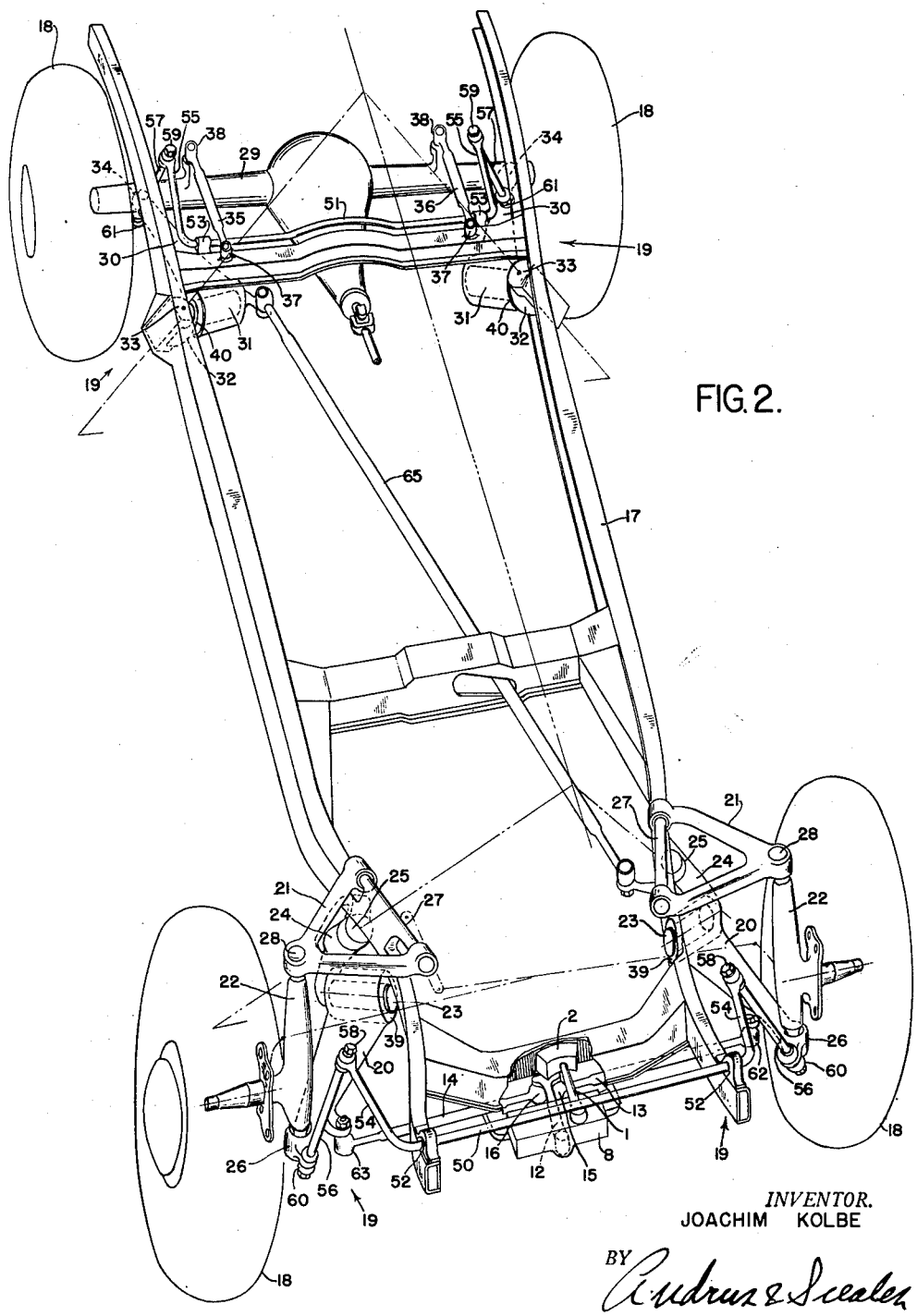
Fig. 2 is a perspective view of a banking vehicle in normal upright position and in which the release mechanism is shown arranged according to the invention.
Figure 9:
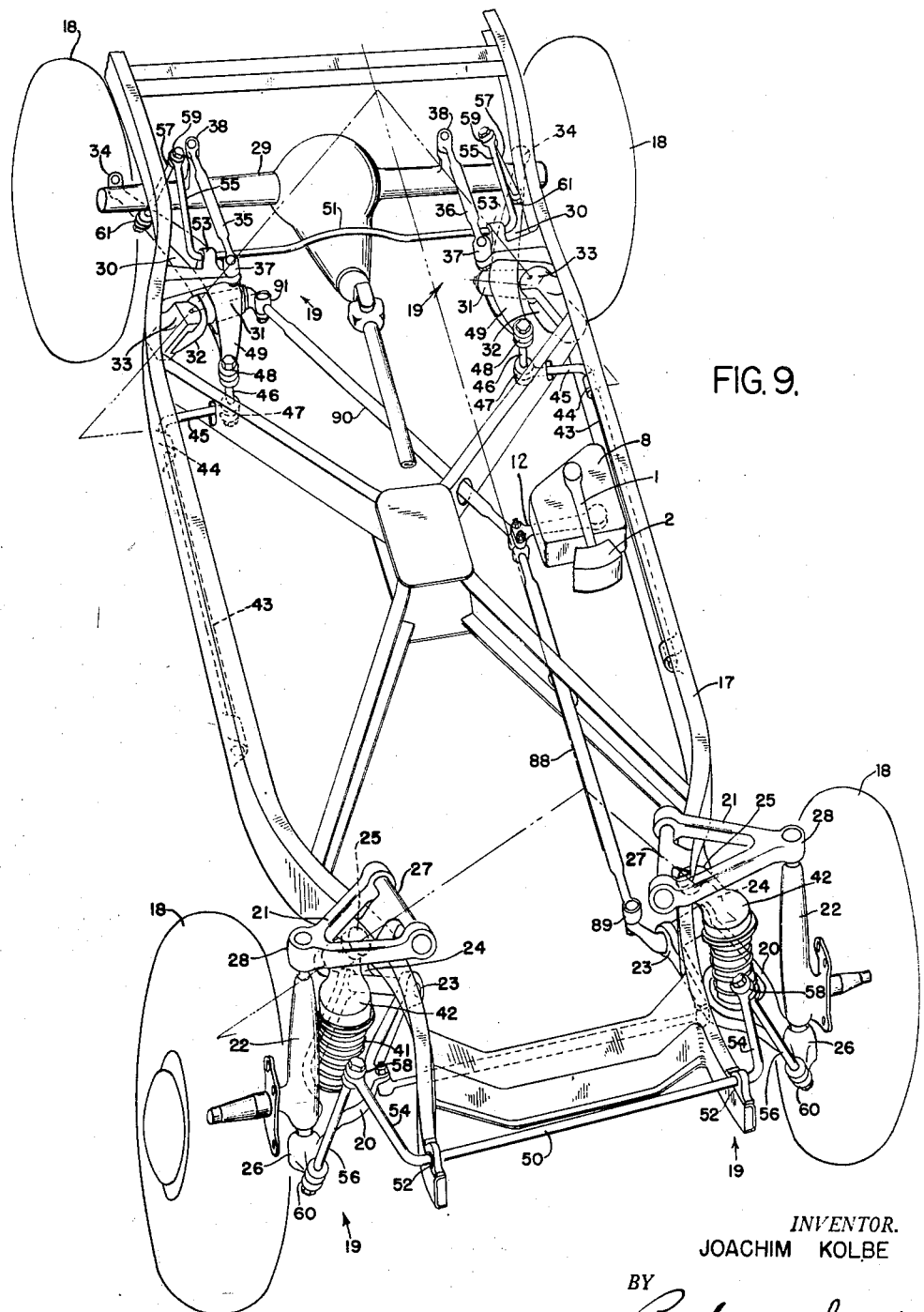
Fig. 9 is a perspective view of a banking vehicle and of control mechanism similar to that shown in Figure 1 and arranged intermediate the front and rear pairs of wheels to function according to the invention.

Figures 2 and 9 and partially Fig. 3 disclose two forms of arrangement of the mechanism illustrated in Fig. 1 and described above, within a superstructure supported by roll banking arms similar to structure disclosed in applicant's U. S. Patent No. 2,576,686, issued November 27, 1951, and more specifically described in applicant's co-pending application U. S. Serial No. 382,412, filed September 25, 1953, now Patent No. 2,760,785, dated August 28, 1956, and wherein the superstructure including engine and body is represented by the frame 17. The wheels 18, supporting the superstructure, are arranged in two pairs, one pair at the front end and the other pair at the rear end of the superstructure. The wheels of each pair are disposed on opposite sides of the superstructure and are equally spaced from the longitudinal center plane of the superstructure. The wheels 18 are secured to the superstructure by wheel or axle carriers 19 which provide for vertical oscillation of each wheel relative to the superstructure. The wheel or axle carriers 19 are arranged in pairs similar to the wheels and each pair is employed for connecting the corresponding pair of wheels to the superstructure.

The front wheels 18 and their corresponding wheel carriers 19 form a front pair of roll banking arms which support the front end of the superstructure. Each front wheel carrier 19 consists of a lower suspension arm 20, an upper control arm 21, and a wheel supported spindle carrier 22 which also serves as a king pin.

Each lower front suspension arm 20 is pivoted at its inner end by a substantially horizontal hinge 23 to a banking hinge support member 24 which in turn is pivoted to the superstructure frame 17 by an inclined roll banking hinge 25. The outer end of each lower front suspension arm 20 is pivotally connected to the lower end of the spindle carrier 22 by the ball and socket joint 26. Each upper front control arm 21 is pivotally connected at its inner end by the hinge 27 to the frame 17 and is connected at its outer end by the ball and socket joint 28 to the upper end of the spindle carrier 22 which forms an integral part of the spindle.

The outer ends of the front wheel carriers 19 are interconnected as described hereinafter to compel the front roll banking arms to operate in unison during banking.

The rear wheels of the embodiments shown in Figs. 2 and 9 are carried by a rigid axle housing structure 29. The rear axle carriers 19 are in the form of roll banking arms to support the rear end of the superstructure for banking. Each rear carrier 19 has a lower suspension arm 30 pivoted at its forward end by a substantially horizontal hinge 31 to a roll banking arm hinge support member 32 which in turn is pivoted to the frame 17 by an inclined roll banking hinge 33. The rearward end of each lower rear suspension arm 30 is pivoted to the axle housing structure 29 by a universally movable ball and socket joint 34.

Upper rear torque rods 35 and 36 extend longitudinally of the vehicle and are each connected at the forward end to the frame 17 by ball and socket joints 37, and connected at the rear end to the axle housing 29 by ball and socket joints 38.

As shown in Figs. 2 and 3 resilient support for the superstructure is secured by rubber torsion springs 39 which are interposed between the front lower suspension arms 20 and the corresponding banking hinge support members 24. Rubber torsion springs 40 are interposed between the rear lower suspension arms 30 and the corresponding banking hinge support members 32 of the vehicle illustrated in Fig. 2. The torsion springs 39 and 40 consist of cylindrical rubber units which are attached with their outer surfaces to the lower suspension arms 20 and 30 respectively and attached with their inner surfaces to the hinge shafts 23 and 31, respectively.

Fig. 9 illustrates a modified embodiment of resilient support for the superstructure. Coil springs 41 are bridging the distance between the front lower suspension arms 20 and the brackets 42 extending outwardly from the front hinge support members 24. In the rear of the vehicle, the torsion springs 43 extend from the center part of the frame 17 to the rear roll banking arms on each side of the superstructure. The front end of each rear torsion spring 43 is rigidly secured to the superstructure. The rear ends of the torsion springs 43 are rotatably supported by the frame 17 in the bearings 44 and shaped to form transversely and horizontally extending lever arms 45. The inner end of each torsion spring lever arm 45 is connected to a shackle 46 by a lower ball joint like connection 47. The shackle 46 has an upper ball joint like connection 48 to the cantilever arm 49 extending forwardly from the lower rear suspension arm 30.

As shown in Figs. 2 and 9, the front pair of roll banking arms are correlated in its lateral movement to the rear pair of roll banking arms by a suitable connecting means as described hereinafter.

The superstructure illustrated in Figs. 2, 3, and 9 is free to turn about its roll banking motion center located near the height of its center of superstructure mass in response to unsymmetrical loading of the superstructure. The sway bar 50 in the front of the vehicle and the sway bar 51 in the rear of the vehicle are arranged to maintain a normal upright position of the superstructure during straight ahead ride of the vehicle. The front sway bar 50 extends transversely of and is rotatably supported by the frame 17 in the bearings 52 and comprises rearwardly and substantially horizontally extending arms 54. The rear sway bar 51 extends transversely of and is rotatably supported by the frame 17 in the bearings 53 and comprises rearwardly and substantially horizontally extending arms 55. The free ends of the arms 54 in the front of the vehicle and of the arms 55 in the rear of the vehicle are connected to the front shackles 56 and to the rear shackles 57 respectively by universally movable pivotal or rubber bearings 58 and 59, respectively. The front shackles 56 are connected to the outer ends of the lower suspension arms 20 by the universally movable pivotal or rubber bearing 60. The rear shackles 57 are connected to the rear axle housing 29 by the universally movable pivotal or rubber bearings 61.

The sway bars 50 and 51 control the position of the superstructure relative to the road as described in applicant's co-pending application U. S. Serial No. 382,412 referred to above. The tendency of the sway bars to resist deflection and the freedom of the superstructure to turn freely about its banking motion center located in height of its center of mass combine to keep the superstructure level during curve ride, where the shackles 56 and 57 are arranged parallel to each other, and to roll the superstructure into a banked position where the corresponding shackles 56 and 57 of each pair are arranged inclined relative to each other.

The control mechanism arranged between the four banking arms of the banking vehicle referred to above and designed to secured coordinated and simultaneous swinging of all banking arms completes the description of one modification of the banking running gear of the vehicle to which the present invention is applied.

Experience shows that without application of control mechanism according to the invention it is difficult to keep the banking running gear from shifting laterally relative to the superstructure even in straight ahead ride, because centrifugal force is not the only lateral force active on the vehicle. Road shock forces exerted on the wheels frequently are exerted in a direction inclined relative to the road bed. Lateral components of these forces tend to shift the vehicle running gear relative to the frame within the freedom provided by the lateral flexibility of the tires and in that way constitute a disturbing influence. Especially where clearance within the steering mechanism of the vehicle allows the front wheels to shimmy, such periodic shimmy turns of the steerable wheels about their king pins will not, as in standard cars, be opposed by the mass of the superstructure tending to move ahead undisturbed in a straight line, but will in two motion center banking cars, allow vibrations sometimes coinciding with the laterally shifting running gear of such magnitude that control of the vehicle is seriously affected.

The present invention discloses suitable means for diverting all lateral components of road shock forces directly into the main mass of the superstructure without restricting the freedom of the superstructure to shift laterally relative to the banking running gear under the influence of centrifugal forces.

A gear control mechanism according to the invention as illustrated in Fig. 1 and described above and attached to the superstructure with connecting means extending between the banking running gear and the gear control mechanism will divert horizontal road shock forces or force components into the frame 17 without any shifting of the running gear relative to the frame.

In the operation and application of the mechanism as illustrated in Figs. 1, 2, and 3, the weight block 2 attached to the outer end of the weight lever 1 will shift laterally under the influence of centrifugal force whenever the vehicle negotiates a curve. This shifting of the weight block 2 and the turn of the lever 1 will cause a rotation of the worm rod 7 by means of the speed up gear mechanism 3, 4, 5, and 6 and a lateral shifting of the nut block 9 in a direction opposite to that of the weight block 2. The nut block 9 rotates by means of the shackle 10 the inner lever 11 and with it the outer lever 12 and causes the ball joints 15 and 16 to shift laterally in a direction opposite to that of the weight block 2 relative to the superstructure.

The ball and socket joints 15 and 16 constitute the inner ends of a pair of tie rods 13 and 14, which are attached by ball and socket joints 62 and 63 to the corresponding lower front suspension arms 20 to secure coordinated turn of the pair of front roll banking arms as described above. In this manner hardly any frictional resistance is offered the banking turn of the superstructure during curve ride.

It should be clearly understood that the banking turn is caused not by the shifting of the weight block 2 but by the natural resistance of the sway bars 50 and 51 against deflection. The banking turn is made possible by the pairs of banking hinges 25 in the front and 33 in the rear of the vehicle which permit free and easy turn of the superstructure about its own center of mass, similar to that of a wheel turning about its spindle. The shifting of the weight 2 constitutes only a release for such turn, which is normally blocked by the worm gear and nut block 9 seated on the worm gear 7 and not free to shift laterally unless a turn of worm gear 7 is taking place.

Both the tendency of the superstructure to bank and the shifting of the weight block 2 simultaneously are needed for the banking operation and one cannot act without the cooperation of the other. This constitutes a safeguard not only in straight ahead ride but also during curve ride where side forces in addition to the centrifugal force and resulting from road shocks may occur but will be blocked as long as the weight block 2 stays in its intermediate position.

The force diverter unit can be made more sensitive by the use of frictionless bearings in some or all of the supporting bearings and gears and a corresponding change in the ratios of turn of the structural components. However, since as great a resistance as possible is desired in opposition to unwanted lateral shift of the running gear relative to the superstructure, a simple inexpensive mechanism will be sufficient in most applications for the desired control.

The shifting of the weight block 2 is opposed by a spring 64 which secures a return of weight 2 to its normal center position when not subjected to lateral forces. The spring 64 might be precompressed as shown in Fig. 1 to permit banking of the superstructure in response to centrifugal forces of a given magnitude only. The spring 64 may be eliminated where the weight block 2 is suspended in form of a pendulum although in that case the difference only in inclination of pendulum position to final superstructure position can be made use of for operating the release mechanism.

The position of the weight block 2 within the superstructure will be influenced by lateral forces which normally tend to shift the superstructure laterally relative to its upright longitudinal center plane.

Road shock forces, which especially on a speeding car, do not have a tendency to displace the whole superstructure out of its upright position, will not influence the weight block 2, since it forms a part of the sprung mass of the vehicle. They will not, therefore, cause a turn of worm gear 7. Any lateral force components resulting from road shocks and transmitted by one of the tie rods 13 or 14 into the worm gear will be carried axially along the worm gear 7 directly into the housing 8 and the superstructure frame 17.

Where the control mechanism is interposed between the front tie rods 13 and 14, a vehicle steering mechanism with two separate steering tie rods as shown in dot-dash outline in Fig. 2 has to be provided. Similar steering gear is described in some of the embodiments of U. S. Patent No. 2,581,030, issued January 1, 1952, to the present inventor and related to steering mechanism for banking arm supported vehicles.

A single front to rear tie rod 65, as illustrated in Fig. 2, will be sufficient to secure coordination in the operation of the front and rear pairs of banking arms.

Figure 4:
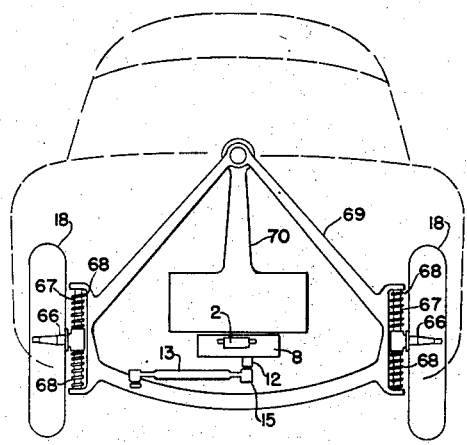
Fig. 4 is a schematic front end elevation of a banking vehicle including a pendulum like suspended superstructure including release mechanism arranged according to the invention.
Figure 5:
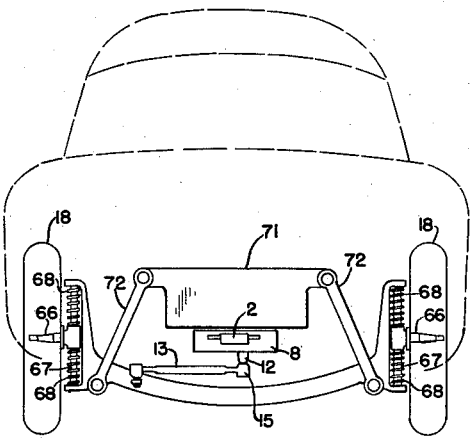
Fig. 5 is a schematic front end elevation of a banking vehicle including a superstructure supported by a pair of inclined links and release mechanism according to the invention.

The proper placing of a force diverter according to this invention and described above and illustrated in Fig. 1 is shown in Figs. 4 and 5 as applied to a true pendulum banking car and to a banking car with a superstructure supported by inclined links respectively. In both embodiments the wheels 18 are supported by a sliding mechanism consisting of spindles 66 sliding along vertical shafts 67 and opposed in their sliding motions by vehicle main support springs 68. The sliding mechanism described is carried by the support unit 69 shaped in the embodiment shown in Fig. 4 to hingedly support the superstructure mass 70 in form of a pendulum and shaped in the embodiment shown in Fig. 5 to support the superstructure 71 by means of inclined links 72 as disclosed in U. S. Patent No. Re. 21,605 issued to the present inventor.

The embodiments of the banking car structures illustrated in Figs. 4 and 5 are shown as examples only of structures applicable for the incorporation of the force diverter units disclosed in the present application for Letters Patent. Various other embodiments based on the two motion center principle for banking car suspensions are equally adaptable.

The weight block 2, the housing 8 and the ball joint 15 are shown in both Fig. 4 and Fig. 5. A shift of the weight block 2 to one side within the superstructure 71 will automatically cause a shift of the ball joint 15 to the opposite side, allowing the superstructure to move into the desired banked position.

Figure 6:
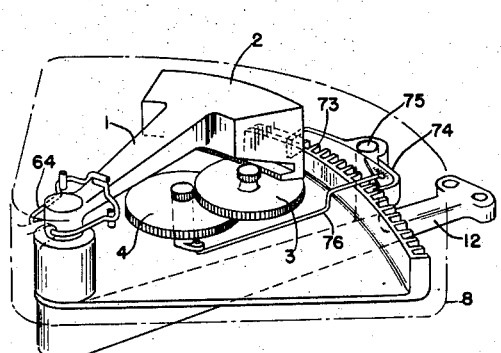
Fig. 6 is a perspective view of a release mechanism designed to function according to the invention.

Figure 6 discloses an embodiment of a force diverter for banking vehicles of the ratchet or friction brake type.

The swinging motion of the weight block 2 supported by the lever 1 causes a gear train 3 and 4 to accelerate that motion and transform it into a full rotational motion. A toothed segment 73 rigidly attached to the housing 8 constitutes the basis for the ratchet double hook lever 74 swinging about the shaft 75 which in turn is supported by the tie rod lever 12. Only during the swinging of the double hook lever 74 is the tie rod lever 12 free to swing about its own housing supported shaft 75. This swinging of lever 74 is controlled by guide rod 76, transmitting turn motion of the gear plate 4 into forth and back motion of the double hook lever 74. Operation of the tie rod lever 12 without swinging of the weight block 2 into the opposite direction is blocked by the double hook lever 74 which at all times has at least one of its hooks firmly engaged between the teeth of the segment 73.

The relative motions between the weight lever 1 and the tie rod lever 12 and also the proper location of this embodiment of the invention within the vehicle are similar to those described and illustrated in Figs. 1–5.

Figure 7:
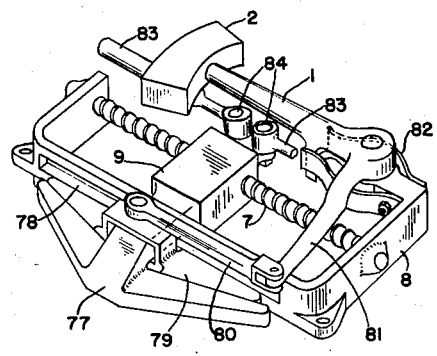
Fig. 7 is a perspective view of another mechanism designed to function according to the invention.

Figure 7 discloses an embodiment of a force diverter for two motion center banking vehicles based on the use of wedges released or applied as required to allow and prohibit lateral motion between the superstructure and the banking running gear respectively according to the invention.

Within a gear frame or housing 8 a worm gear 7 which in this embodiment may be a simpler slide guide, is rotatably placed to support a nut block 9 which forms an integral part of a wedge basis 77 and which is also supported by the guide slot 78 in the frame. A pair of interlocked wedges forming an integral wedge block 79 are placed between the wedge basis 77 and the housing 8 with limited clearance between wedge and wedge basis. A link 80 pivotally connects the wedge block 79 with the bell crank arm 81 which forms an integral part of the weight lever 1. A precompressed weight lever control spring 82 controls the swinging of the weight 2. The ratio of reduction for the worm gear 7 is designed to reduce forces exerted on the nut block 9 by the tie rods 83 through the ball and socket joint connections 84, diverting a substantial part thereof directly into the housing 8 and the superstructure without preventing the nut block 9 to shift along the axis of the worm gear 7 under the impact of said forces, unless blocked by one of the wedges of the wedge block 79 pressing itself between the wedge basis 77 and the housing 8. This blocking will not take place whenever the weight block 2 will shift under the influence of centrifugal forces causing by operation of the bell crank lever 81 and the link 80 a shift of the wedge block 79 to coincide with and take place parallel to the shifting of the nut block 9 along the axis of the worm gear 7.

The force diverter according to Fig. 7 is illustrated to suit an application intermediate the front to rear tie, coordinating the swinging of the front and rear pairs of banking arms similar to the application illustrated in Fig. 9. For this reason the lever arm 1 in Fig. 7 is shown extending parallel to tie rods 83.

Figure 8:
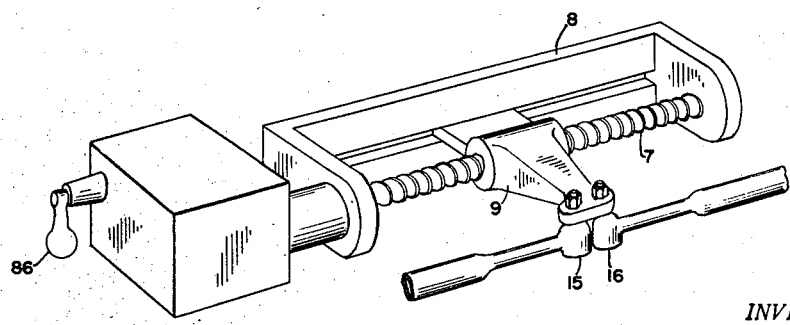
Fig. 8 is a diagrammatic perspective view of an assist-power mechanism arranged to operate the release mechanism according to the invention.
Figure 10:
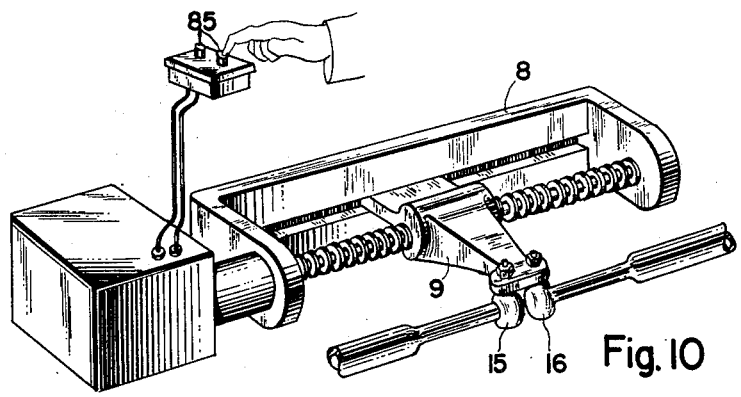
Fig. 10 is a view similar to Fig. 8 showing electrical control means.
Figure 11:
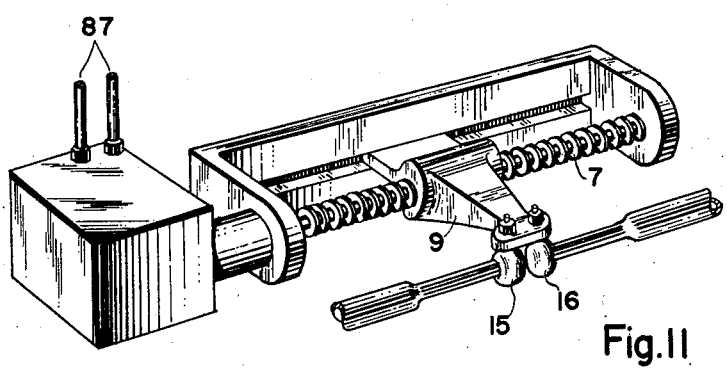
Fig. 11 is a view similar to Figs. 8 and 9 showing hydraulic control means.

Figures 8, 10 and 11 illustrate schematically the force diverter according to this invention and some of the possibilities for furnishing the relatively small forces needed to operate it and in the previous embodiments shown as being furnished by simple weight shifting. Where the invention is applied to larger vehicles or where weight saving is of importance, as in race cars, the device might be restricted to a simple worm gear 7, rotatably extending through a nut block 9 which supports the tie rod ball and socket joints 15 and 16 and is additionally guided by the device housing or frame 8. The turn of the worm gear 7 might be secured by an electric motor controlled by switch 85, as shown in Fig. 10, or by a small pendulum 86, as shown in Fig. 8. A hydraulic circuit might be employed as indicated with reference number 87 as shown in Fig. 1, and hand or pendulum control might regulate the hydraulic, or compressed or vacuum air fluid mechanism or any combination thereof. Many control mechanisms are known and employed on present day vehicles and can be employed in combination with the present invention. The exact description of structure and operation of such units is beyond the scope of the present invention. The worm gear and nut mechanism might be of the roller sector and hourglass worm gear type, or a cam and lever type gear unit might be used, similar to that employed in the steering system of most of our present day cars.

Figure 9 finally illustrates the application of a force diverter unit described above and shown in Fig. 1 and placed intermediate the front to rear tie mechanism referred to above. The coordinating tie mechanism consists of a longitudinally extending front tie rod 88 attached by ball and socket joint 89 to the front roll banking hinge support member 24, and a diagonally extending rear tie rod 90 attached by the ball and socket joint 91 to the rear roll banking hinge support member 32 located on the opposite side of the vehicle. The adjacent ends of the tie rods 88 and 90 located intermediate the front and rear pairs of roll banking arms have a common support in the operating lever 12 which forms part of the force diverter unit described above. The weight lever 1 is shown extending longitudinally of the vehicle to secure shifting of the weight block 2 under the influence of centrifugal forces. The tie rod support lever 12 extends transversely of the vehicle to secure longitudinal guiding motion for the front to rear tie rods.

In general, while a shifting weight especially provided for that purpose has been described as the main source of power for the operation of the force diverter mechanism according to the invention, any weight block normally incorporated into an automobile such as the battery, the vehicle engine, the bumpers, or the like, can be arranged to slide laterally a certain amount under the influence of centrifugal forces and to thereby furnish the motion necessary to operate the force diverter mechanism during curve ride.

The force diverter according to this invention serves as a regulator for banking of the superstructure and as a means of guiding road shock force components straight into the superstructure mass and also as a stabilizer against forces applied unsymmetrically on the superstructure. For instance, two passengers seated on the same side of the vehicle would tend to cause a shifting of weight block 2 and allow the superstructure to move into an inclined position until the turning moment is balanced by the deflection of the sway bar torsion springs 50 and 51 shown in Figs. 2 and 9. Such one-sided force, however, constitutes 10% only of the maximum possible lateral force still within the limits of safety against sliding of the superstructure during curve ride on dry roads. Within the 10% limit the weight can be kept non-responsive to such lateral forces and with it a turn of the superstructure about its banking motion center can be blocked.

The vertical components of road shock loads also will be absorbed substantially exclusively within the main vehicle support springs and will not tend to cause a turn of the superstructure about its banking motion center in vehicles equipped with the force diverter according to this invention, as long as the control weight is kept in its center position during straight ahead ride and is not shifted in addition to its desired shifting during curve ride. Counterbalancing forces or mechanism within the mainspring support structure, such as described in applicant's co-pending application U. S. Serial No. 382,412, filed September 9, 1953, might therefore be eliminated and the roll banking car structure to that extent be simplified.

Various modes of carrying out the invention are contemplated as within the scope of the following claims, particularly pointing out and distinctly claiming the subject matter which is regarded as the invention.

I claim:

1. In combination with a superstructure banking vehicle wherein the superstructure and running gear are connected in a manner providing for a wheel oscillation motion center zone located near the road and for a superstructure banking motion center zone located near the center of mass of the superstructure, means additionally connecting the superstructure and running gear and rigidly preventing relative lateral movement between the same, and means responsive to inertia forces to release said means and provide for relative lateral movement between the superstructure and the running gear effected by similar inertia forces, as in banking of the superstructure.

2. The combination of claim 1 wherein said last named means is actuated by inertia weight means disposed to be responsive to centrifugal forces as the vehicle passes a curve in the road and the banking of the superstructure on the curve is effected by similar centrifugal forces.

3. A superstructure banking vehicle having a running gear including wheel supporting means, pivotal means, linkage means, and resilient means arranged to provide for a wheel oscillation motion center located near the road and about which the vehicle will turn outwardly during curve ride and for a superstructure banking motion center located near the center of mass of the superstructure and about which the superstructure will turn during curve ride in a direction opposite to the first named turn, and comprising self-locking gear sets connecting the superstructure and the running gear and constituting a force diverting device to block lateral turn of the superstructure about the banking motion center initiated by lateral force components resulting from forces exerted on the wheels, and means to operate said gear sets to permit lateral turn of the superstructure about the banking motion center in response to centrifugal forces exerted on the vehicle.

4. In a superstructure banking vehicle a running gear comprising paired front and rear wheels and wheel carrying members, linkage and resilient support means extending between the wheel carrying members and intermediate support members providing a wheel deflection center zone located near the road about which the vehicle turns during curve ride, and pivotal means arranged between said intermediate support members and the superstructure and providing a superstructure banking motion center zone located near its center of mass, means coordinating the relative motion between the wheels and the superstructure during banking, and control means comprising in combination a speed up train of gears and a self-locking reduction gear set interposed between said running gear and the superstructure, a weight carried by the superstructure and arranged to shift laterally under the influence of centrifugal force to operate the speed up train of gears and thereby actuate the reduction gear, thereby providing for lateral shifting of said superstructure relative to said running gear under the influence of centrifugal forces on the superstructure.

5. In a superstructure banking vehicle wherein the superstructure is adapted to move laterally relative to the running gear in response to centrifugal forces on a road curve, gear means connecting the superstructure and the running gear and constructed to be self locking as to relative lateral forces therebetween, and means carried by the superstructure to actuate said gear means to free the same for relative lateral movement between the superstructure and running gear during banking while retaining said locking as against other than centrifugal forces on the superstructure.

6. The construction of claim 5 wherein the superstructure is suspended as a pendulum by longitudinally extending hinges carried by the running gear and providing a pendulum axis substantially above the center of mass of the superstructure, and said gear means connects the superstructure with the running gear at a substantial distance from the pendulum axis determined by said hinges, whereby pendulum movement of the superstructure is blocked for all forces other than centrifugal forces.

7. The construction of claim 5 wherein the superstructure is mounted upon the running gear by means of a plurality of pairs of links oppositely inclined toward each other and operable to effect banking of the superstructure in response to lateral movement of the same relative to the running gear.

8. The construction of claim 5 wherein the running gear comprises a plurality of pairs of banking arms, and means to interconnect the same to act in unison, and said gear means is disposed between the superstructure and said interconnecting means.

9. The construction of claim 5 wherein the running gear comprises at least one pair of banking arms having means interconnecting the same, and said gear means is disposed between the superstructure and said interconnecting means.

10. The construction of claim 5 wherein the running gear comprises a plurality of longitudinally spaced pairs of interconnected banking arms, and means extending generally longitudinally of the vehicle to interconnect the pairs of banking arms, and said gear means is disposed between the superstructure and said last named means.

11. The construction of claim 5 wherein said gear means comprises a self locking worm gear unit blocking relative lateral displacement between the superstructure and running gear in the absence of rotation of the worm, and said actuating means comprises an inertia weight lever arm pivoted to the superstructure on an axis substantially offset from a transverse direction and with the arm normally extending in a direction also offset from a transverse direction to provide for actuation of the arm by centrifugal forces on a road curve, and gear means connecting the arm to said worm to effect rapid turning of the worm in response to small increments of movement of the inertia weight lever arm under centrifugal forces.

12. The construction of claim 5 wherein said gear means comprises a self locking worm gear unit blocking relative lateral displacement between the superstructure and running gear in the absence of rotation of the worm, and said actuating means comprises an inertia weight lever arm pivoted to the superstructure on an axis substantially offset from a transverse direction and with the arm normally extending in a direction also offset from a transverse direction to provide for actuation of the arm by centrifugal forces on a road curve, gear means connecting the arm to said worm to effect rapid turning of the worm in response to small increments of movement of the inertia weight lever arm under centrifugal forces, and means to return said lever arm to normal direction upon termination of the centrifugal forces displacing the same.

13. The construction of claim 5 wherein said gear means comprises a self locking worm gear unit blocking relative lateral displacement between the superstructure and running gear in the absence of rotation of the worm, and said actuating means comprises means to drive the worm in accordance with the requirement for banking of the superstructure on turns.

14. The construction of claim 5 wherein said gear means comprises a self locking worm gear unit blocking relative lateral displacement between the superstructure and running gear in the absence of rotation of the worm, said actuating means comprises means to drive the worm in accordance with the requirement for banking of the superstructure on turns, and automatic means actuated by centrifugal forces to control said drive means.

15. A vehicle comprising a superstructure adapted to bank on turns, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, each of said banking arms being articulated to provide for vertical oscillation of one end relative to the other upon an effective oscillation pivotal axis, resilient means disposed to bridge the oscillation axis, means interconnecting the banking arms to retain the effective universally movable joints in substantially constant spaced relation, and a self locking gear set connecting the superstructure and said banking arms and arranged to block turn of said banking arms relative to said superstructure initiated by forces exerted on the wheels without interfering with turn of said banking arms relative to the superstructure in response to centrifugal forces exerted on the superstructure during curve ride of the vehicle.

16. A vehicle comprising a superstructure adapted to bank on turns, a plurality of pairs of opposed roll banking arms disposed to support said superstructure on rigid axle structures and spaced longitudinally of the same with at least one pair arranged in the front and at least one pair in the rear of the superstructure and with the banking arms of each pair connected to the superstructure laterally apart on opposite sides of the longitudinal center line of the superstructure, resilient means arranged to secure banking of the superstructure during curve ride, a tie connecting at least one banking arm disposed in the front of the vehicle to one banking arm disposed in the rear of the vehicle to induce the front and rear pairs of banking arms to move laterally substantially in unison during the banking of the superstructure, a gear mechanism constituting a force diverter device and arranged to carry forces exerted on the running gear into the superstructure and to permit the superstructure to bank in response to centrifugal forces exerted on the superstructure, said device being interposed between the superstructure and said tie connecting one front banking arm to a corresponding rear banking arm.

17. The invention defined in claim 16 wherein said front pair of banking arms constitutes an independent wheel suspension for the pair of front wheels and wherein said force diverter device is operated by a shifting weight carried by the superstructure and activated during curve ride.

18. A vehicle comprising a superstructure adapted to bank on turns, a plurality of sets of front and rear wheel carriers disposed to support said superstructure and spaced longitudinally of the same, each set of carriers together with the wheels associated therewith constituting at least a pair of opposed roll banking arms arranged to provide a roll banking motion center located in the height of the center of gravity of the superstructure, resilient means associated with each carrier and disposed to provide for relative vertical oscillation between the superstructure and the point of effective road support for the corresponding banking arm, said roll banking arms each including a roll banking hinge support member having an axis located inclined towards the median plane and the vertical transverse planes for the vehicle intersecting the wheel centers and providing freedom for the superstructure to roll about an effective motion center located approximately in the height of its center of mass, additional resilient means in the form of a sway bar carried by the superstructure at at least one end and connected to the outer ends of the wheel carriers by means of shackles arranged to secure roll banking about the banking motion center, said wheel carriers resiliently supporting the superstructure and resisting wheel oscillation with a reaction load on the superstructure substantially equal and in a direction opposite to that caused by said sway bar, a tie rod connecting at least one front roll banking arm to one rear roll banking arm, a tie connecting the front pair of roll banking arms, control means interposed between the superstructure and said tie comprising in combination a speed up train of gears and an irreversible reduction gear set driven thereby, and a weight carried by the superstructure and arranged to shift laterally under the influence of centrifugal force to operate the reduction gear and thereby permit lateral shifting of said running gear relative to the lower part of said superstructure.

19. In a banking vehicle of the class described, the combination of a superstructure, a support therefor adapted to guide the superstructure into a banked position on turns, a self-locking reduction gear mechanism between the superstructure and support to block relative lateral shifting of the same resulting from road shocks on the wheel, means responsive to centrifugal forces on turns to actuate said gear mechanism to utilize relative lateral shifting between the superstructure and its support in moving the superstructure to a banked position.

20. The construction of claim 19 wherein the support comprises front and rear sets of banking arms, each comprising at least one pair of opposed banking arms.

References Cited in the file of this patent

UNITED STATES PATENTS

| 2,279,120 | Hurley | Apr. 7, 1942 |
| 2,341,726 | Kolbe | Feb. 14, 1944 |
| 2,580,558 | Kolbe | Jan. 1, 1952 |

FOREIGN PATENTS

| 807,309 | France | Jan. 9, 1937 |